Nov. 20, 1923. 1,474,562
T. R. STANCOMBE
COMBINED ELECTRIC COOKER AND WATER HEATER APPARATUS
Filed Aug. 6, 1923
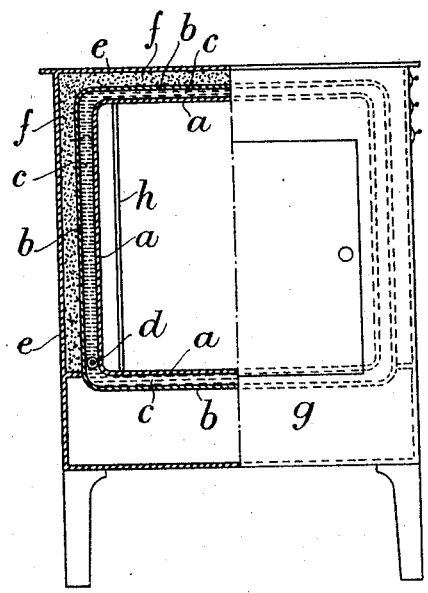
Inventor:
Thomas Reginald Stancombe,
By Toulmin & Toulmin,
Attorneys.

Patented Nov. 20, 1923.

1,474,562

UNITED STATES PATENT OFFICE.

THOMAS REGINALD STANCOMBE, OF BRISTOL, ENGLAND.

COMBINED ELECTRIC COOKER AND WATER-HEATER APPARATUS.

Application filed August 6, 1923. Serial No. 656,059.

*To all whom it may concern:*

Be it known that I, THOMAS REGINALD STANCOMBE, of 10 St. Matthews Road, Cotham, Bristol, England, a subject of the King of Great Britain and Ireland, have invented certain new and useful Combined Electric Cooker and Water-Heater Apparatus, of which the following is a specification.

This invention relates to electric cooking and water heating apparatus of that kind wherein an oven is associated with a water chamber in such manner that the water is heated by radiation from the oven aided, if necessary, by an independent heater.

In one known arrangement, the oven is surrounded at the sides only by an open-topped water chamber fitted with a closure, and closed at the bottom by the general structure where it is also furnished with an independent heater.

In another known arrangement, the oven is combined with a water chamber which extends only for a part of the depth of the oven and is arranged saddle-fashion.

Apparatus according to my invention is characterized in that the oven is wholly surrounded by the water chamber, excepting for the door opening therein, with the consequential advantages in the way of circulation and so forth.

I will now fully describe the invention with reference to the accompanying drawing which represents a preferred construction half in central vertical section and half in elevation.

*a* denotes the oven of ordinary rectangular construction which is heated in the usual way. The oven is surrounded on all four sides by a casing *b* which, with the oven *a*, forms the water chamber *c*. The chamber *c* is heated by radiation from the oven *a*, but it is adapted for independent heating by a heater (or there may be more than one) situated at the bottom of the chamber as indicated at *d*.

The casing *b* is surrounded at the top and sides by another casing *e* for the purpose of enclosing a lagging *f* of any appropriate material.

Therefore, it will be seen that in apparatus constructed as described when the oven is in use the water in the chamber *c* is heated and is capable of returning its heat to the oven *a* with the resulting saving; and that the water chamber *c* may be independently heated in case of need or as an auxiliary.

A hot cupboard may be associated with the apparatus as depicted at *g*, the same being heated from the water chamber *c*.

A polished reflector *h* may be disposed within the oven *a*.

Though not shown, the water chamber *c*, is provided with a steam outlet, draw-off tap and filling means.

What I claim and desire to secure by Letters Patent is:—

1. A cooking and water heating apparatus of the kind described comprising a cooking chamber normally closed and having its walls of heat conducting material, said cooking chamber being adapted to be heated from its interior, a jacket surrounding and enclosing the walls of the cooking chamber and being spaced from the latter providing a closed water chamber having inlet and outlet openings, whereby the water in said latter chamber is heated from the heat within the cooking chamber, an auxiliary heater in the water chamber, and heat insulating material exterior of said jacket.

2. A cooking and water heating apparatus of the kind described comprising a cabinet having a warming compartment in its lower part and an oven section mounted in its upper part, said oven section consisting of a cooking chamber normally closed and having its wall of heat conducting material and being adapted to be heated from its interior, a jacket surrounding and enclosing the walls of the cooking chamber and spaced from the wall of the latter providing a closed water chamber having inlet and outlet openings, whereby the water in the latter chamber is heated from the heat in the cooking chamber, heat insulating means between the side and top walls of the jacket and of the cabinet, the bottom wall of the jacket being exposed to the interior of the warming compartment, and a door for said oven section.

In testimony whereof I affix my signature.

THOMAS REGINALD STANCOMBE.